United States Patent [19]

Morgan et al.

[11] 4,364,214

[45] Dec. 21, 1982

[54] DECORATIVE PANEL ASSEMBLY FOR VEHICLES

[75] Inventors: Cleon Morgan; Richard Pluta; John F. Thomas, Jr., all of Holland, Mich.

[73] Assignee: Donnelly Mirrors, Inc., Holland, Mich.

[21] Appl. No.: 194,470

[22] Filed: Oct. 6, 1980

[51] Int. Cl.³ .............................................. B44F 7/00
[52] U.S. Cl. ...................................... 52/311; 52/511; 428/428
[58] Field of Search ................ 52/311, 171, 822, 511; 428/428

[56] References Cited

U.S. PATENT DOCUMENTS

| | | |
|---|---|---|
| 226,770 | 4/1880 | Morse . |
| 394,910 | 12/1888 | Buttler ............................... 428/428 |
| 753,967 | 3/1904 | Eustis . |
| 2,015,484 | 9/1935 | Lilenfeld ............................... 49/81 |
| 2,436,728 | 2/1948 | Parsons ............................... 296/44 |
| 2,502,970 | 4/1950 | Manning ............................ 171/327 |
| 2,683,678 | 7/1954 | Adams ............................. 154/2.71 |
| 2,744,592 | 5/1956 | Remond ........................... 189/36.5 |
| 2,928,967 | 3/1960 | Pfaender ............................. 313/64 |
| 2,972,808 | 2/1961 | Litton ............................... 29/473.1 |
| 3,096,061 | 7/1963 | Bertell ............................... 248/288 |
| 3,120,369 | 2/1964 | Gray, Jr. ............................ 248/223 |
| 3,131,251 | 4/1964 | Ryan ................................... 88/98 |
| 3,385,618 | 5/1968 | Hargis ......................... 287/189.365 |
| 3,430,333 | 3/1969 | Hodgen ............................. 29/472.9 |
| 3,458,242 | 7/1969 | Williams ............................ 312/258 |
| 3,524,215 | 8/1970 | Kurtz ................................. 16/124 |
| 3,652,112 | 3/1972 | Panelli ............................... 292/210 |
| 3,711,893 | 1/1973 | King ................................... 16/128 |
| 3,781,044 | 12/1973 | Quensnel et al. ................... 292/200 |
| 3,816,690 | 6/1974 | Middelmann ..................... 219/10.77 |
| 3,827,184 | 8/1974 | Pennec et al. ....................... 49/449 |
| 3,885,072 | 5/1975 | Zibritosky ........................... 428/38 |
| 3,916,055 | 10/1975 | Wagner ............................. 428/161 |
| 3,961,120 | 6/1976 | Hearn et al. .................... 428/428 X |
| 3,978,633 | 9/1976 | Scheidler et al. .................... 52/400 |
| 4,032,740 | 6/1977 | Middelmann ..................... 219/10.77 |
| 4,124,239 | 11/1978 | Horton .............................. 292/210 |
| 4,130,751 | 12/1978 | Gordon ............................... 219/98 |
| 4,163,884 | 8/1979 | Kobetsky ..................... 219/10.49 R |
| 4,167,259 | 9/1979 | Bury .............................. 248/205 A |
| 4,226,068 | 10/1980 | Wadsworth ..................... 52/511 X |

FOREIGN PATENT DOCUMENTS

| | | |
|---|---|---|
| 702578 | 11/1965 | Canada ................................ 88/109 |
| 678891 | 9/1952 | United Kingdom . |
| 1011740 | 12/1965 | United Kingdom . |
| 1015997 | 1/1966 | United Kingdom . |

OTHER PUBLICATIONS

Drawing No. D4NB-6529672-BB entitled "Weather-strip-Rear Quarter Window," dated 7/6/72, Ford Motor Company.

"How Ceramic Paint is Made," *Glass Decorating, Diversified Growth with Ease,* Society of Glass Decorators, 12th Annual Seminar, Oct. 20, 1975, Chatham Center, Pittsburgh, Pennsylvania, pp. 72-74.

*Primary Examiner*—Price C. Faw, Jr.
*Assistant Examiner*—Carl D. Friedman
*Attorney, Agent, or Firm*—Price, Heneveld, Huizenga & Cooper

[57] ABSTRACT

A decorative panel assembly for vehicles adapted for exterior installation having a sheet-like panel, preferably formed from glass, a frit layer, preferably including fused ceramic particles and a coloration pigment, fused to one surface of said panel, and at least one attaching member secured over the frit layer to fasten the assembly to a vehicle body. Preferably, the attaching member is metallic and is bonded over the ceramic frit layer with a suitable metal-to-glass and/or ceramic frit adhesive, while the ceramic frit layer is preferably opaque to conceal the attaching member from view. A trim member or casing may be included around the edge of the panel to decoratively finish the assembly and help space and locate the assembly on the vehicle body.

25 Claims, 5 Drawing Figures

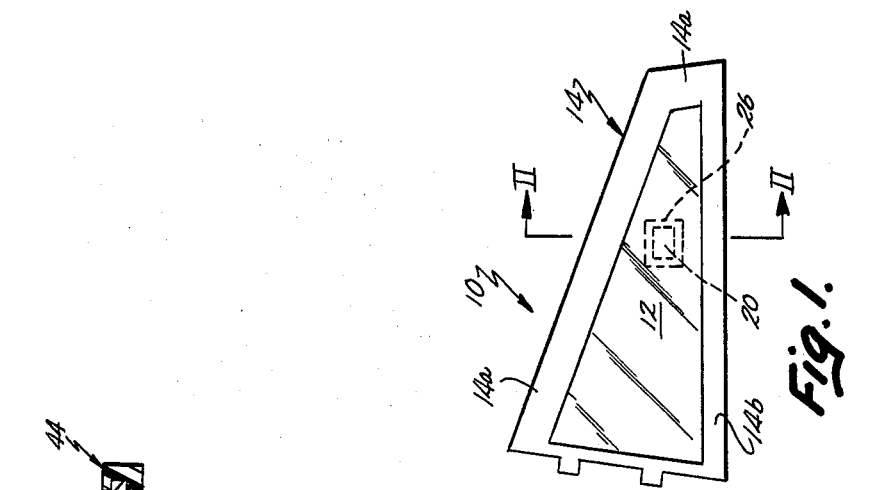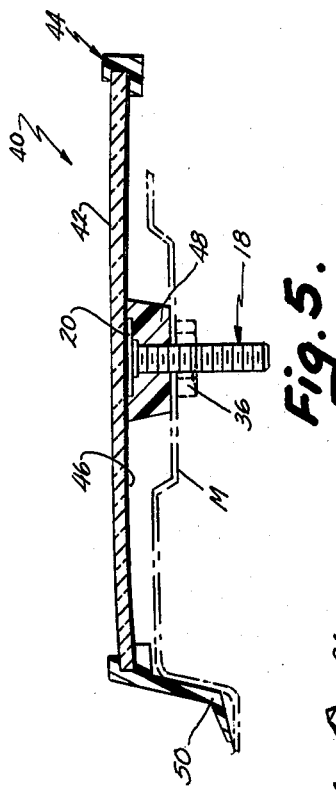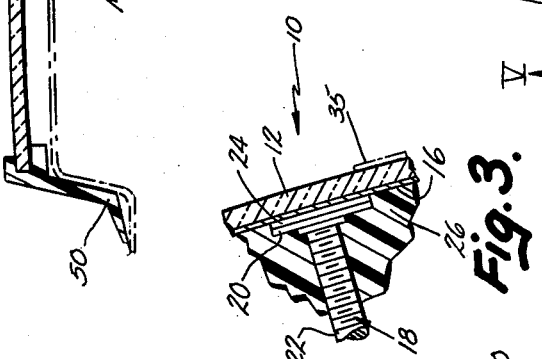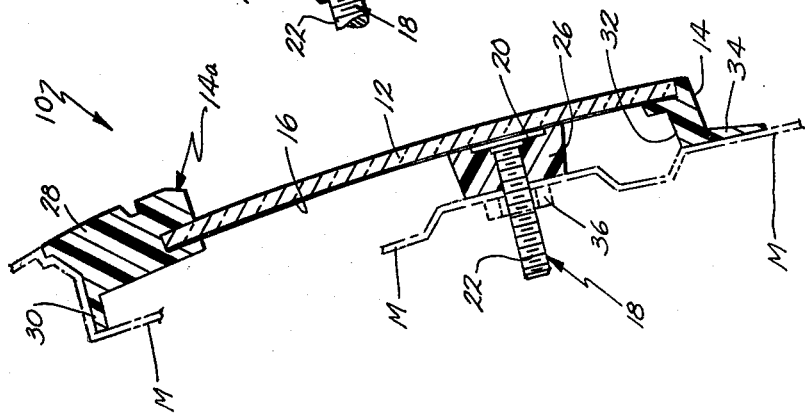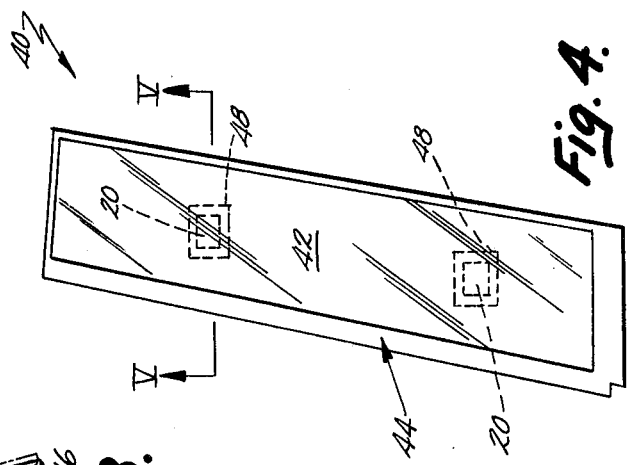

DECORATIVE PANEL ASSEMBLY FOR VEHICLES

BACKGROUND OF THE INVENTION

This invention relates to panel assemblies for vehicles, and more particularly, to a decorative panel assembly designed for installation as a complete unit substantially entirely from the exterior of a vehicle.

In recent years, various decorative trim parts have been provided adjacent or between various windows along the sides of automobiles and other vehicles. One such area is the pillar area between the front and back side windows of a sedan-type automobile. Attempts have been made to use plastic panels as such pillar decoration. Such panels were injection molded from polycarbonate or other moldable materials in the desired shape and contour. Even though such molded panels were coated with various protective layers, they were found to be readily susceptible to scratches and marring, and were not sufficiently durable to withstand the various environmental conditions to which an automobile or other vehicle is exposed.

In addition, the prior panels had various appearance drawbacks which made them less than desirable for use as a primarily decorative panel. For example, when such panels were molded from a resinous plastic, and included fastener areas for attachment of the panel to a vehicle, it was difficult to avoid sink marks visible from the panel exterior at the point the fasteners were attached. In addition, even when protectively coated, the resinous plastic panels failed to provide the desired appearance of depth to match the glass areas adjacent either side thereof, and thus failed to produce an overall satisfying appearance.

Further, it was often necessary to assembly the prior decorative panels from separate parts in piecemeal steps from both the interior and exterior of a vehicle. Such assembly techniques were time consuming and added expense to the manufacturing cost of the overall vehicle.

The present invention was conceived as a solution to the above decorative panel problems.

SUMMARY OF THE INVENTION

Accordingly, the present invention provides a decorative panel assembly for vehicles which is installed as a unit substantially entirely from the exterior of the vehicle and provides an appearance which coordinates well with the surrounding and adjacent structures on the vehicle. The invention is characterized by a sheet-like panel, preferably formed from glass, having a layer of ceramic frit fused to one surface and at least one attaching member secured by a suitable bonding adhesive to the ceramic frit layer to enable attachment of the entire panel substantially entirely from the vehicle exterior.

In one aspect, the invention provides a decorative panel assembly including a sheet-like panel, a frit layer fused to at least one of the surfaces of the panel, and attaching means secured to the panel over the frit layer for fastening the panel assembly to an adjacent support.

The attaching means are preferably formed from metal and are adhered to the frit layer, and thus to the panel, by a suitable bonding adhesive intermediate the attaching member and the frit layer. Preferably, the panel is formed from glass while the frit layer includes fused ceramic particles and a suitable pigment which makes the frit layer opaque thereby concealing the attaching means. Further, a decorative trim may be included around at least portions of the panel peripheral edge surface to provide a finished edge on the panel without requiring additional or separate trim portions to be applied after installation.

The bonding adhesive may be that sold under the trademark "Tenabond" by Illinois Tool Works, Inc. of Elgin, Ill. or another suitable metal-to-glass adhesive such as anerobic polyacrylate cement, vinyl acetate/phenol formaldehyde or epoxy cement.

The decorative panel assembly of the present invention provides numerous advantages over prior known decorative and/or trim assemblies. The present assembly, because of the inclusion of glass, is scratch resistant and otherwise very durable and fully sufficient for use in the environments to which automobiles and other vehicles are exposed. The assembly is simple in design and includes few parts, while being formed as a complete unit which can be installed in a single step substantially entirely from the exterior of the vehicle with only the attachment of suitable nuts or other fasteners to retain the assembly on the vehicle being necessary from the vehicle interior. In addition, the preferred form of the assembly totally conceals the fasteners used to secure it on the vehicle, and also provides the desired depth of appearance and coordination with adjacent areas such as glass windows, when used as a pillar or other adjacent vehicle side decoration. In addition, portions of the assembly which help provide a finished appearance for the assembly also help to space and locate the assembly on the vehicle body.

These and other objects, advantages, purposes and features of the invention will become more apparent from a study of the following description taken in conjunction with the drawings.

BRIEF DESCRIPTION OF THE DRAWINGS

FIG. 1 is a front view of one embodiment of the decorative panel assembly of the present invention;

FIG. 2 is a sectional elevation of the panel assembly of FIG. 1 taken along plane II—II of FIG. 1;

FIG. 3 is an enlarged, fragmentary, sectional view of one of the attaching studs bonded to the ceramic frit layer overlying the glass panel of the assembly shown in FIGS. 1 and 2;

FIG. 4 is front view of a second embodiment of the decorative panel assembly of the present invention; and FIG. 5 is a sectional view of the panel assembly of FIG. 4 taken along plane V—V of FIG. 4.

DESCRIPTION OF THE PREFERRED EMBODIMENTS

Referring now to the drawings in greater detail, FIGS. 1–3 illustrate a first embodiment 10 of the decorative panel assembly for vehicles of the present invention. Panel assembly 10 is typically designed for installation and attachment as a complete unit over an exterior portion of a sheet metal vehicle body at a specified position which includes a recessed or other contoured sheet metal portion M designed to receive the panel assembly as shown in FIG. 2. Generally, the panel assemblies of the present invention are especially useful as decoration adjacent window areas of the vehicle, such as on a roof support pillar between front and back sidelites in a vehicle or to the rear of the back side window. They are especially useful in these positions because the panel, as is more fully described below, preferably includes a sheet of glass which is covered on its rear surface with a preferably opaque ceramic frit layer thereby continuing the appearance of glass in the decorative panel assembly and coordinating that assembly from an appearance standpoint with the window glass on one or both sides of the decorative assembly. In addition, when the ceramic layer is opaque and of a dark color, a rich satisfying appearance of depth is provided with the panel assembly which further enhances the appearance of the window areas on the vehicle.

As shown in FIGS. 1-3, assembly 10 includes a truncated, generally triangular glass panel 12 surrounded and encased by a peripheral decorative trim or casing 14 extending along and enclosing the top, bottom and both end edges of the glass panel. Prior to the molding of the decorative trim or casing 14 around the glass panel, a ceramic frit layer 16 is applied to the rear surface of the glass panel and one or more attaching studs 18 are positioned and adhesively bonded over the ceramic frit layer for attachment of the panels to the vehicle body.

More specifically, glass panel 12, which is in an untempered condition after cutting and sizing to its desired shape, is painted by screen coating or other techniques, with a coating of dark ceramic paint on its rear surface as shown in FIGS. 2 and 3. Thereafter, the glass panel is suitably heated and bent to the desired contour with a bending furnace or other bending apparatus, followed by tempering the heated, bent, contoured glass sheet to strengthen the glass. Such heating, bending and tempering operations cause the ceramic paint on the rear surface of the glass to become fused to the glass rear surface. Thus, although starting as a layer of paint containing ceramic particles and pigment, coating 16 ends up, after bending and tempering processes, as a thin frit layer of low melting point ceramic material which, in actuality, is fused to the rear surface of glass panel 12. Since ceramic frit layer 16 includes pigment of a desired color, preferably a dark color such as black, dark blue, or the like, the layer results in a permanent, second surface coloration of the glass panel. When viewed from the front side, the transparent thickness of the panel 12, backed up by the colored ceramic frit layer 16, provides an appearance of depth and richness which blends well with the surrounding glass areas on a vehicle.

The preferred ceramic paint used to form the opaque, black ceramic frit layer 16 described above is that manufactured by Drakenfeld Color, Inc. of Washington, Pa. Such paint includes small ceramic particles and a suitable metal oxide pigment suspended in oil of a type conventionally known in the art. The preferred pigment in such paint is carbon black to cause the resulting frit layer to be opaque and black in color. This ceramic paint is preferably screen coated on the rear surface of glass panel 12 using a 200 mesh screen and covering the entire rear surface. The resulting frit layer 16 has the ceramic particles melted and fused to one another, is permanently bonded and fused to the rear glass surface, and is the equivalent of the glass itself in terms of strength and adherence.

A pair of attaching members, such as ferromagnetic studs 18, are applied to ceramic frit layer 16 on panel 12. As shown in FIGS. 1-3, each attaching member 18 includes a rectangular, circular or other shaped base 20 and a threaded shaft 22 welded or otherwise secured to base 20. Shaft 22 projects perpendicularly to the plane of base 20 and to the rear surface of panel 12. Attaching studs 18 are secured to ceramic frit layer 16 via base 20 and a suitable bonding adhesive layer 24 (FIG. 3) which is intermediate the base 20 of stud 18 and ceramic frit layer 16. Studs 18, of which there may be one or more in any of the decorative assemblies, are preferably formed from ferromagnetic metal and fastened intermediate the peripheral edges of the glass in the middle area of the rear surface of the glass panel 12 as is shown in FIG. 2.

One preferred adhesive system found suitable for the attachment of studs 18 directly to ceramic frit layer 16, and thus to panel 12, and especially to tempered glass as used in the present invention, is that marketed under the trademark "Tenabond" by Illinois Tool Works, Inc. of Elgin, Ill. Such system is believed to include an epoxy adhesive layer 24 typically applied in tape form to the base 20 of stud 18. The base with the adhesive layer thereon is pressed against the rear surface of the glass 12 and heated rapidly using an induction heating apparatus of the type shown in any one of U.S. Pat. Nos. 3,816,690, 4,032,740, 4,163,884 or 4,167,259. Such rapid heating activates the adhesive and causes the stud to be rigidly and securely bonded by what is believed to be mechanical bond directly to frit layer 16. Such induction heated adhesive more securely bonds the metal to frit layer 16 than do cold, unheated adhesives. Moreover, the induction heating system provides localized heat which is sufficiently intense to properly activate the adhesive without affecting the temper of the glass, or the frit layer 16, to which the stud is being applied. Therefore, the strength and integrity of the glass and frit layer. to which the stud is bonded are not affected by the heating and the resultant metal to glass and frit layer assembly is stronger and more durable than with other adhesives.

Tests performed on one form of stud 18 bonded directly to ceramic frit layer 16 of tempered glass panel 12 with the Tenabond adhesive system have shown that stud 18 can withstand 563 p.s.i. in shear strength and 1000 p.s.i. of tension without separating from frit layer 16. Such tests were conducted with a stud having a base 20 with an area 0.5 square inches after exposing the bonded stud to hot and cold temperature cycling, high humidity soaking and hot water soaking, and ultraviolet light (simulated sunlight). Such environmental testing of the Tenabond secured studs have thus shown bonds in such conditions to exhibit strengths in excess of those required for proper retention in vehicles.

Other suitable adhesives for metal-to-glass and/or frit layer bonds useful in the present invention include anerobic polyacrylate cement such as that disclosed in U.S. Pat. No. 3,885,072, vinyl acetate/phenol formaldehyde containing adhesives such as that disclosed in U.S. Pat. No. 2,502,970, or epoxy containing cement such as that disclosed in Canadian Pat. No. 702,578. The disclosures of the above-identified patents including such adhesives are hereby incorporated by reference herein.

Following application and bonding of studs 18 in the appropriate locations on the rear surface of the glass panel 12, the ceramic frit coated panel with studs 18 attached is inserted in a suitable injection mold. The decorative trim or casing 14 is then injection molded around the periphery of the glass panel in a desired shape and form such as that shown in FIG. 2. In addition, a pre-molded spacer pad 26 is telescoped around the base and the lower portion of the threaded shaft 22 of each stud 18. Such spacer pad 26 provides a flexible, resilient buffer or locater spacing the center portion of the panel assembly 10 from the body sheet metal M of the vehicle body when the decorative assembly is applied to the vehicle body as shown in FIG. 2.

As will be seen from FIG. 2, the molded trim or casing 14 includes portions of differing shapes and sizes on the top, bottom and end surfaces. Trim portion 14a extends along the top and rear edge surface and includes the frame portion 28 and a locating or spacer portion 30 which seats against the body sheet metal M and supports the decorative panel at a spaced location from that body sheet metal as shown in FIG. 2. The frame portion 28 extends around the front, back and peripheral edge surfaces of the panel 12 and extends inwardly toward the center of the panel a predetermined distance to enable secure bonding of the casing to those portions of the glass panel. On the bottom and forward edges of the glass panel 12, trim portion 14b is smaller in size than portion 14a and includes a frame portion 32 which engages the rear and peripheral end edge surfaces of the glass panel 12 as well as a locating and spacing portion 34 which engages the body sheet metal M. The injection molding of casing or trim portion 14 around the periphery of the glass panel 12 and frit layer 16 automatically bonds those casing portions to the panel. A suitable primer may be coated on the panel in the areas to which the casing will be molded to facilitate such adherence. Preferably, those casing portions are molded from polyvinyl chloride and are sufficiently resilient and flexible to provide proper spacing, resistence to corrosion, and noise free assembly to the body sheet metal.

After forming ceramic frit layer 16 on panel 12, and either before or after studs 18 and/or casing 14 are applied to the coated panel, silver or other coatings 35 may be applied to the front surface of panel 12 in stripes or a pattern for decoration as shown in phantom in FIG. 3. Such paint adheres well to the glass surface and enhances the decorative appearance of the assembly.

Assembly of panel 10 to a vehicle occurs by providing an aperture through the body sheet metal in alignment with each attaching stud 18, inserting the panel such that studs 18 project through those openings in the body sheet metal, and applying a speed nut or other fastener 36 to the attaching stud from the interior side of the body sheet metal to securely retain the entire assembly in place. Such assembly causes sealing engagement of the polyvinyl chloride trim casing 14 with the surrounding body sheet metal to resist entry of water or other contaminants behind the panel. In addition, since ceramic frit layer 16 is preferably opaque, attaching studs 18 are concealed from view after such assembly because they are hidden behind layer 16. Attachment of studs 18 in this manner avoids the previously known sink marks which were encountered when prior known decorative panels were molded entirely from plastic thereby providing an enhanced appearance for the assembly.

A second form 40 of the decorative panel assembly is shown in FIGS. 4 and 5 and is designed for attachment to a pillar between adjacent windows in a vehicle. In a manner similar to that described for window assembly 10, assembly 40 includes a sheet-like, tempered glass panel 42 having a decorative trim or casing 44 injection molded from polyvinyl chloride around its periphery. Prior to molding edge casing 44, a ceramic frit layer 46 is fused to the rear surface of glass panel 42 in the manner described above for layer 16 followed by the attachment of a pair of attachment studs 18 substantially similar to those described above. Studs 18 are adhesively bonded to ceramic frit layer 46 with a suitable metal-to-glass and/or frit adhesive in the type and manner described above. The ceramic layer 46 is again applied in the form of paint containing pigment and ceramic particles and fused during the heating, bending and tempering processes for glass panel 42 followed by the application and securement of attaching studs 18. Thereafter, edge casing 44, which extends around the front, rear and peripheral edge surfaces of the glass panel 42 as shown in FIG. 5, is injection molded to bond the panel to complete the assembly. A spacer pad 48, previously injection molded from polyvinyl chloride is telescoped over each stud attaching studs 18 in the manner described above. As in assembly 10, molded polyvinyl chloride casing 44 includes locating or spacing flanges such as that shown at 50 to engage, seal and properly locate the assembly 40 when studs 18 are received through suitable apertures in the body sheet metal M and secured with appropriate speed nuts 36 or the like to retain the assembly in place. Decorative silver or other coating in a desired pattern may also be applied to the front surface of glass 12 as in assembly 10.

Accordingly, the decorative panel assembly of the present invention is manufactured as a complete unit and easily installed in substantially one step from the exterior of a vehicle with only the final fastening step being necessary from the interior. Portions of the panel assembly properly space and locate as well as seal the assembly to the body sheet metal and provide a coordinated appearance with the adjacent window areas in a vehicle.

Of course, other trim members or peripheral casings could be used in place of the injection molded polyvinyl chloride casings 14 and 44 described herein. Likewise, other attaching stud configurations and/or a spacer pads in place of studs 18 and pads 26 could also be used without deviating from the spirit of this invention.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows.

1. A decorative panel assembly for vehicles adapted for installation as a unit from the exterior of a vehicle comprising:
   a sheet-like panel having front, back and peripheral edge surfaces;
   a frit layer fused to at least one of said surfaces of said panel;
   attaching means secured to said panel on said frit layer for fastening said panel assembly to an adjacent support.

2. The panel assembly of claim 1 wherein said attaching means are concealed from view behind said frit layer and panel when said assembly is viewed from a direction opposite to said surface on which said frit layer is fused.

3. The panel assembly of claim 1 including bonding means intermediate said attaching means and frit layer for bonding said attaching means to said panel.

4. The panel assembly of claim 3 including a decorative trim extending around at least portions of said panel peripheral edge surface to provide a finished edge on said panel.

5. The panel assembly of claim 4 wherein said decorative trim includes means for locating said panel at a position spaced from an adjacent support.

6. The panel assembly of claim 4 wherein said decorative trim is a casing enclosing said peripheral edge surface of said panel and molded from a resinous plastic material.

7. The panel assembly of claim 6 including a spacing member surrounding said attaching means and being molded from a resinous plastic material.

8. The panel assembly of claim 4 including spacing means positioned intermediate said peripheral edge surfaces over said frit layer for spacing said panel assembly from an adjacent support.

9. The panel assembly of claim 3 wherein said attaching means are metal; said panel is glass; said frit layer including ceramic particles fused together and to said one surface of said panel and constituting a ceramic frit layer; said bonding means including an adhesive sufficient to adhere said metal attaching means to said glass panel over said ceramic frit layer.

10. The panel assembly of claim 9 wherein said adhesive is chosen from the group including anerobic polyacrylate cement, vinyl acetate/phenol formaldehyde, and epoxy cement.

11. The panel assembly of claim 9 wherein said adhesive is a heat activatable epoxy cement adapted for activation by induction heating.

12. The panel assembly of claim 1 wherein said frit layer is formed from a ceramic paint applied to said panel surface and including ceramic particles, being applied to said glass panel prior to any heating, bending or tempering operations on said glass, said layer including said ceramic particles fused together and to said glass surface.

13. The panel assembly of any of claims 1, 2, 3, 8 or 11 wherein said panel is transparent; said frit layer including a pigment causing it to be opaque.

14. The panel assembly of claim 1 or 3 wherein said attaching means includes at least one rigid, metallic stud bonded over said frit layer to said panel, said stud projecting away from said frit layer.

15. The panel assembly of claim 1 in combination with a vehicle body, said vehicle body including means for receiving said assembly on the exterior thereof; fastening means engaging said attaching means to retain said assembly on said vehicle body exterior.

16. A decorative panel assembly for vehicles adapted for installation as a unit from the exterior of a vehicle comprising:
a sheet-like glass panel;
a ceramic frit layer fused to at least one surface of said panel;
metallic attaching means secured to said ceramic frit layer for attaching said panel to a support on a vehicle body;
bonding means intermediate said attaching means and ceramic frit layer for bonding said attaching means to said ceramic frit layer, said bonding means including an adhesive suitable for securing metal to glass and said ceramic frit layer; and
decorative trim means extending around the periphery of said panel for finishing the edge of said panel.

17. The panel assembly of claim 16 wherein said attaching means are rigid; said panel is glass; said bonding means including an adhesive sufficient to adhere said metal attaching means to said glass panel on said ceramic frit layer.

18. The panel assembly of claim 17 wherein said ceramic frit layer is formed from a ceramic paint applied to said panel surface and including ceramic particles, said layer being applied to said glass panel prior to any heating, bending or tempering operations on said glass, said layer including said ceramic particles fused together and to said glass surface.

19. The panel assembly of claim 18 wherein said adhesive is a heat activatable epoxy cement adapted for activation by induction heating.

20. The panel assembly of claim 18 wherein said adhesive is chosen from the group including anerobic polyacrylate cement, vinyl acetate/phenol formaldehyde, and epoxy cement.

21. The panel assembly of claim 16 wherein said attaching means includes at least one rigid metallic stud bonded over said ceramic frit layer to said panel, said stud projecting away from said ceramic frit layer.

22. The panel assembly of claim 21 including a spacing member surrounding said attaching means.

23. The panel assembly of claim 16 or claim 21 wherein said decorative trim is a casing molded from a resinous plastic material enclosing said peripheral edge surface of said panel, and including means for supporting said panel assembly on an adjacent support.

24. The panel assembly of claim 16 or claim 18 wherein said panel is transparent; said ceramic frit layer including a pigment causing it to be opaque whereby said attaching means are concealed from view when said assembly is viewed from a direction opposite to said surface to which said ceramic frit layer is fused.

25. The panel assembly of claim 16 in combination with a vehicle body, said vehicle body including means for receiving said assembly on the exterior thereof; fastening means engaging said attaching means to retain said assembly on said vehicle body exterior; said decorative trim means including means engaging said vehicle body for supporting said panel assembly on said vehicle body.

* * * * *